(12) United States Patent
Raether

(10) Patent No.: US 8,057,563 B2
(45) Date of Patent: *Nov. 15, 2011

(54) FILTER APPARATUS CONFIGURATION OF PULSED CLEANED PANEL-STYLE FILTERS AND METHODS

(75) Inventor: Thomas D. Raether, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 648 days.

This patent is subject to a terminal disclaimer.

(21) Appl. No.: 11/946,925

(22) Filed: Nov. 29, 2007

(65) Prior Publication Data
US 2008/0127826 A1 Jun. 5, 2008

Related U.S. Application Data

(60) Provisional application No. 60/867,852, filed on Nov. 30, 2006.

(51) Int. Cl.
*B01D 46/04* (2006.01)
(52) U.S. Cl. .......... 55/302; 55/341.1; 55/341.7; 55/484; 55/521; 95/280
(58) Field of Classification Search .............. 55/293, 55/302, 441, 283, 294, 301, 341.1, 341.2, 55/341.3, 341.5, 341.7, 484, 521; 95/280, 95/278; 96/349, 428
See application file for complete search history.

(56) References Cited

U.S. PATENT DOCUMENTS

| | | | |
|---|---|---|---|
| 2,591,198 | A | 4/1952 | Ringe |
| 2,748,948 | A | 6/1956 | Fricke et al. |
| 2,836,257 | A | 5/1958 | Muller |
| 3,095,290 | A | 6/1963 | Hockett |
| 3,173,777 | A | 3/1965 | Tamny |
| 3,234,714 | A | 2/1966 | Rymer et al. |
| 3,325,978 | A | 6/1967 | Rymer et al. |
| 3,394,532 | A | 7/1968 | Oetiker |
| 3,402,881 | A | 9/1968 | Moore et al. |

(Continued)

FOREIGN PATENT DOCUMENTS

DE  1 228 130  11/1966

(Continued)

OTHER PUBLICATIONS

International Search Report, mailed May 8, 2008.

*Primary Examiner* — Duane Smith
*Assistant Examiner* — Thomas McKenzie
(74) *Attorney, Agent, or Firm* — Merchant & Gould P.C.

(57) ABSTRACT

An air cleaner includes a housing with a dirty air inlet, a clean air outlet, and an interior. A tubesheet is in the housing interior having a plurality of openings. A panel-style filter arrangement is oriented such that each one of the openings in the tubesheet is covered by the panel-style filter arrangement. A plurality of blowpipes are oriented to direct a fluid pulse at a respective one of the openings in the tubesheet covered by the filter arrangement. Preferably, each blowpipe is oriented to direct a fluid pulse at a respective one of the openings in the tubesheet covered by the panel-style filter arrangement at an angle that is: (i) not normal to a plane of the openings in the tubesheet; and (ii) not in line with a general direction of filtration flow through the panel-style filter arrangement.

5 Claims, 14 Drawing Sheets

U.S. PATENT DOCUMENTS

| | | | |
|---|---|---|---|
| 3,487,609 | A | 1/1970 | Caplan |
| 3,499,268 | A | 3/1970 | Pausch |
| 3,508,383 | A | 4/1970 | Humbert, Jr. et al. |
| 3,509,698 | A | 5/1970 | Medcalf et al. |
| 3,535,852 | A | 10/1970 | Hirs |
| 3,692,184 | A | 9/1972 | Miller, Jr. et al. |
| 3,726,066 | A | 4/1973 | Colley et al. |
| 3,732,669 | A | 5/1973 | Chambers |
| 3,735,566 | A | 5/1973 | Laliwala |
| 3,757,497 | A | 9/1973 | Ray |
| 3,807,150 | A | 4/1974 | Maracle |
| 3,831,354 | A | 8/1974 | Bakke |
| 3,853,509 | A | 12/1974 | Leliaert |
| 3,874,857 | A | 4/1975 | Hunt et al. |
| 3,883,331 | A | 5/1975 | Bernard et al. |
| 3,942,962 | A | 3/1976 | Duyckinck |
| 4,171,963 | A | 10/1979 | Schuler |
| 4,218,227 | A | 8/1980 | Frey |
| 4,227,903 | A | 10/1980 | Gustavsson et al. |
| 4,251,244 | A | 2/1981 | Evenstad |
| 4,272,262 | A | 6/1981 | Britt et al. |
| 4,277,260 | A | 7/1981 | Browning |
| 4,278,454 | A | 7/1981 | Nemesi |
| 4,292,057 | A | 9/1981 | Ulvestad et al. |
| 4,306,893 | A | 12/1981 | Fernando et al. |
| 4,395,269 | A | 7/1983 | Schuler |
| 4,504,288 | A | 3/1985 | Kreft |
| 4,578,092 | A | 3/1986 | Klimczak |
| 4,632,680 | A | 12/1986 | Klimczak |
| 4,661,131 | A | 4/1987 | Howeth |
| 4,820,320 | A | 4/1989 | Cox |
| 4,909,813 | A | 3/1990 | Eggerstedt |
| 4,955,996 | A | 9/1990 | Edwards et al. |
| 5,002,594 | A | 3/1991 | Merritt |
| 5,062,867 | A | 11/1991 | Klimczak |
| 5,062,872 | A | 11/1991 | Williams |
| 5,062,873 | A | 11/1991 | Karlsson |
| 5,393,327 | A | 2/1995 | Chambers et al. |
| 5,421,845 | A | 6/1995 | Gregg et al. |
| 5,562,746 | A * | 10/1996 | Raether ............... 55/302 |
| 5,980,598 | A | 11/1999 | Horvat |
| 6,090,173 | A | 7/2000 | Johnson et al. |
| 6,322,618 | B1 | 11/2001 | Simms et al. |
| 6,673,136 | B2 * | 1/2004 | Gillingham et al. ............ 95/273 |
| 6,908,494 | B2 * | 6/2005 | Gillingham et al. ............ 55/283 |
| 6,960,245 | B2 * | 11/2005 | Tokar et al. .................... 95/273 |
| 7,252,704 | B2 * | 8/2007 | Tokar et al. .................... 95/273 |
| 7,282,075 | B2 | 10/2007 | Sporre et al. |
| 7,388,544 | B2 * | 6/2008 | Bit-Babik et al. ............. 343/702 |
| 2005/0120881 | A1 * | 6/2005 | Sporre et al. ................... 95/280 |
| 2005/0166559 | A1 | 8/2005 | Gilingham |

FOREIGN PATENT DOCUMENTS

| | | |
|---|---|---|
| DE | 1 407 933 | 4/1972 |
| DE | 23 09 666 A1 | 9/1974 |
| DE | 85 36 339 U1 | 5/1987 |
| DE | 39 05 113 A1 | 8/1990 |
| EP | 0123 721 A1 | 9/1983 |
| FR | 1 184 609 | 7/1959 |
| FR | 1 413 752 | 11/1964 |
| FR | 1 590 764 | 4/1970 |
| FR | 2 401 690 | 3/1979 |
| GB | 326 047 | 3/1930 |
| GB | 662.358 | 12/1951 |
| GB | 781 194 | 8/1957 |
| GB | 838 523 | 6/1960 |
| GB | 880 043 | 10/1961 |
| GB | 914 187 | 12/1962 |
| GB | 939 641 | 10/1963 |
| GB | 948 705 | 2/1964 |
| GB | 1016556 | 1/1966 |
| GB | 1113154 | 5/1968 |
| GB | 1 220 174 | 1/1971 |
| GB | 1 345 977 | 2/1974 |
| SU | 627841 | 10/1978 |
| WO | WO 83 01209 | 4/1983 |

* cited by examiner

US 8,057,563 B2

FILTER APPARATUS CONFIGURATION OF PULSED CLEANED PANEL-STYLE FILTERS AND METHODS

CROSS REFERENCE TO RELATED APPLICATION

This application claims priority from provisional application Ser. No. 60/867,852, filed Nov. 30, 2006, and which is incorporated herein by reference.

TECHNICAL FIELD

This disclosure relates to methods for pulse cleaning filter elements utilizing pressurized gas generators. This disclosure also relates to apparatus including air cleaners, dust filters, and pulse cleaning technology.

BACKGROUND

Air cleaners or dust collector devices sometimes use exhaust gas from a valve and pressure tank (reservoir) to back flush filters. Examples of such air filters assemblies are disclosed in, for example, U.S. Pat. Nos. 6,090,173; 4,218,227; 4,395,269; 5,980,598; 6,322,618; DE 3905113; and Patent Publication U.S. 2006/0112667A1, each of these patent documents being incorporated by reference herein.

Effective cleaning of these filters requires that the exhaust jet fill the opening of the filter to be cleaned. In many implementations, the opening of the filter corresponds to the opening in the tubesheet, in which the filter is mounted. Improvements in pulse cleaning filters are desirable.

SUMMARY

An air cleaner is provided that includes a housing with a dirty air inlet, a clean air outlet, and an interior. A tubesheet is in the housing interior having a plurality of openings. A panel-style filter arrangement is oriented such that each one of the openings in the tubesheet is covered by the panel-style filter arrangement. A plurality of blowpipes are provided. Each blowpipe is oriented to direct a fluid pulse at a respective one of the openings in the tubesheet covered by the panel-style filter arrangement. An accumulator arrangement is oriented adjacent to the openings in the tubesheet on a downstream side of the tubesheet. The accumulator arrangement includes, for each opening in the tubesheet, a first and second plate adjacent to opposite ends of the tubesheet opening. Adjacent openings in the tubesheet share a same first or second plate.

Preferably, each blowpipe is oriented to direct a fluid pulse at a respective one of the openings in the tubesheet covered by the panel-style filter arrangement at an angle that is: (i) not normal to a plane of the openings in the tubesheet; and (ii) not in line with a general direction of filtration flow through the panel-style filter arrangement.

A method of pulse cleaning a panel-style filter arrangement oriented to cover openings of a tubesheet is provided. The method includes directing fluid pulses at the openings in the tubesheet and trapping at least a portion of the fluid pulses using first and second plates oriented on the clean air side of the tubesheet and adjacent to opposite ends of each of the openings in the tubesheet. Adjacent openings in the tubesheet share a same first or second plate.

Preferably, the step of directing includes directing fluid pulses at the openings in the tube sheet at an angle that is: (i) not normal to a plane of the opening of the tubesheet; and (ii) not in line with a general direction of filtration flow through the panel-style filter arrangement.

DETAILED DESCRIPTION

Figure 1:
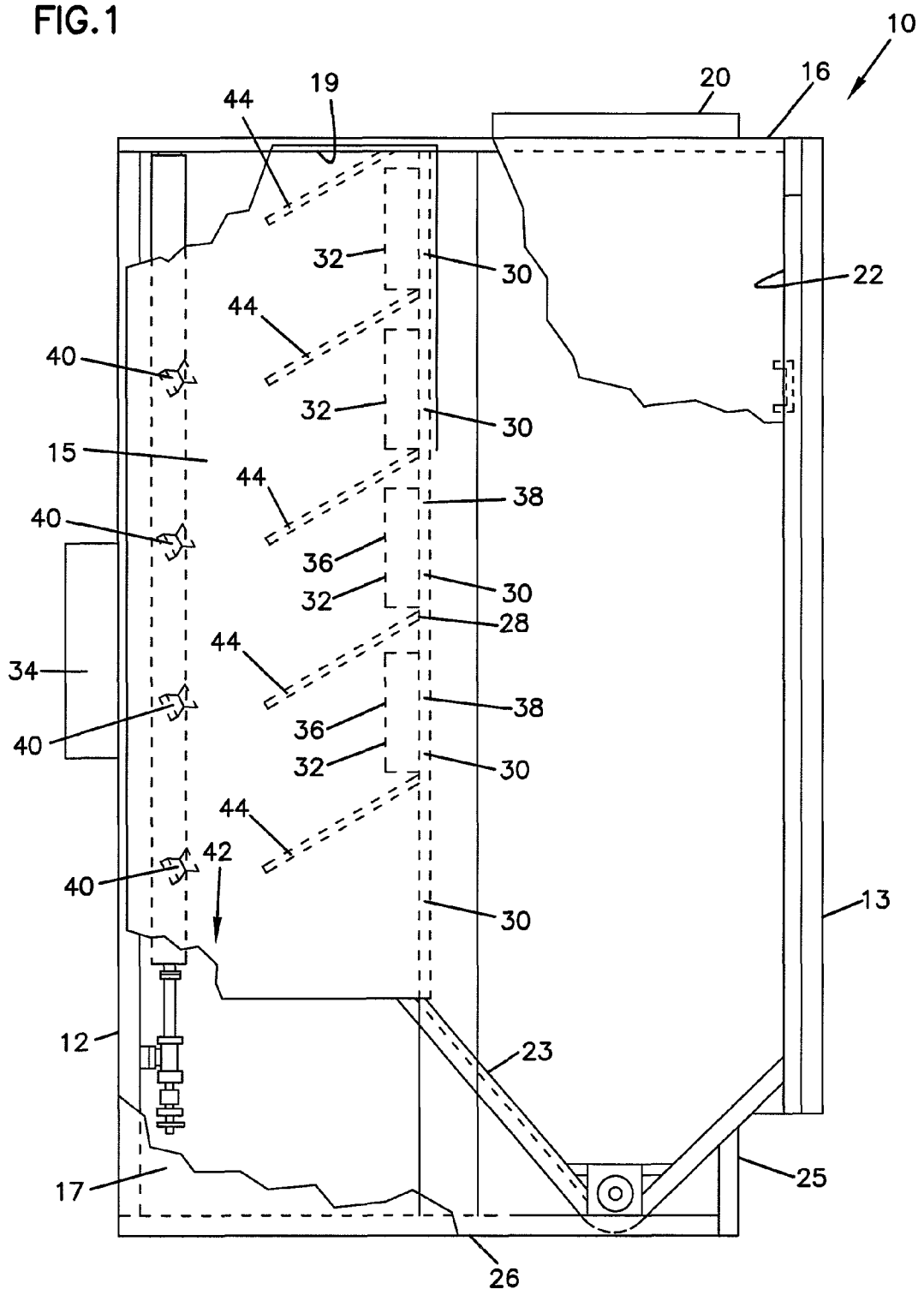
FIG. 1 is a side elevational view, partially broken away, of one embodiment of an air filter system utilizing principles of this disclosure.

A dust filter or air cleaner system is depicted generally at 10 in FIG. 1. The system depicted includes a housing 12 having a side wall panel 17 broken away to illustrate the arrangement of various portions of the assembly. An upper wall panel 16 has an inner wall surface 19. In this embodiment, an air inlet 20 is positioned in the upper wall panel 16 so that the particulate-laden air or other fluid is introduced into an unfiltered (dirty) fluid chamber 22. The unfiltered chamber 22 is defined by an access door 13, the upper wall panel 16, opposing side wall panels 17, a tubesheet 28, and a bottom surface 23 partially defining a collection area or hopper 25. The bottom base panel or frame 26 is secured to the side wall panels 17 in a suitable manner.

As mentioned above, the tubesheet 28 is mounted in the interior of the housing 12. The tubesheet 28 includes a plurality of openings 30. Within each opening 30 is mounted an individual filter element, which in the illustrated embodiment, is a panel-style filter element 32. By the term "panel-style filter element" it is meant an element with filter media in which, in general, fluid to the filtered flows through the filter element in a straight-flow thorough manner. For example, a panel-style filter element can be pleated media, depth media, fluted media, zee media, or mini V-packs. By "Z-media", it is meant media having first and second opposite flow faces with a plurality of flutes, each of the flutes having an upstream portion adjacent to the first flow face and a downstream portion adjacent to second flow face, selected ones at the flutes being open at the upstream portion and closed at the downstream portion, while selected ones of the flutes are closed at the upstream portion and open at the downstream portion. The flutes can be straight, tapered, or darted. Examples of filter elements with Z-media are found in, for example, U.S. Pat. No. 5,820,646; Patent Publication 2003/0121845; and U.S. Pat. No. 6,350,291, each of these patent documents being incorporated by reference herein.

In operation, fluid, such as air, to be filtered flows into the system 10 through the inlet 20. From there, it flows through the filter elements 32. The filter elements 32 remove particulate material from the fluid. The filtered fluid then flows into the clean air or filtered flow chamber 15. From there, the clean air flows through an outlet 34. Periodically, the filter elements 32 will be cleaned by pulsing a fluid jet, such as a jet of air, from a downstream side 36 of the filter element 32 to an upstream side 38 of the filter element 32. Specifically, a jet of pressurized gas will be directed through individual blow pipes 40, a respective blow pipe being oriented for each of the respective filter elements 32. This will direct the jet through each filter element 32, from the downstream side 36 to the upstream side 38. This helps to knock debris and particulate from the upstream side 38 of the filter element 32, directing it off the filter element 32 and into a hopper.

Figure 2:
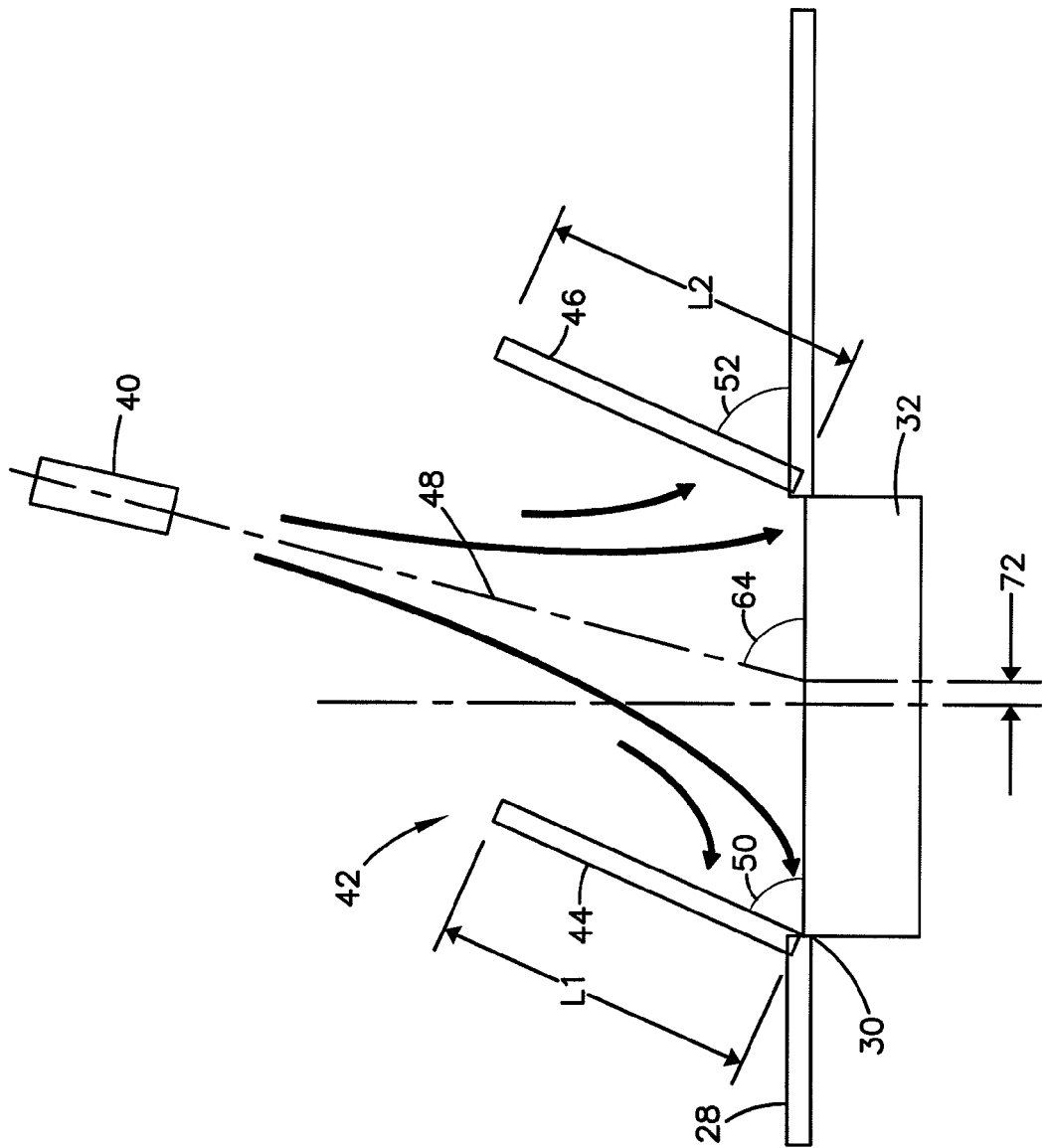
FIG. 2 is a schematic side elevational view illustrating principles of this disclosure.

A schematic illustration of the portion of the system 10 is illustrated in FIG. 2. In FIG. 2, the blow pipe 40 can be seen oriented with respect one the filter elements 32 in the opening 30 in the tubesheet 28. In FIG. 2, it can be seen how the blow pipe 40 is oriented relative to the filter element 32 in a plane 60 (FIG. 3) that contains the respective opening 30 in the tubesheet 28 for the respective filter element 32, such that a pulse that comes from the blow pipe 40 is at an angle that is not normal to a plane of the opening 30 and is not in line with a general direction of filtration flow thorough the filter element 32. By the term "not normal", it is meant non-orthogonal, such as at an acute or obtuse angle relative to the plane 60 that contains the opening 30 for the respective filter element 32. By "not in line with a general direction of filtration flow", it is meant, for a straight-through flow filter, the pulse flow is in a direction that is not parallel to the flow of direction through the filter element 32. By directing the fluid pulse at the filter element 32 at such an angle 64, the exhaust jet, which expands at a predictable angle, creates a diameter D2 (FIG. 3) larger in one direction that a diameter D1 that is typically used in the prior art.

While the illustrated embodiment shows only a single blowpipe 40 corresponding to a single filter element 32, it should be understood that in many implementations, there are more than one blowpipe 40 for each element 32.

In a preferred embodiment, at least a portion of the pulse is trapped by using an accumulator arrangement 42. The accumulator arrangement 42 captures the flow of the pulse from the blow pipe 40. In one embodiment, the accumulator arrangement 42 includes a least one plate, shown as first plate 44, oriented on the clean air side 15 of the tubesheet 28 and adjacent to the opening 30 of the tubesheet 28. The first plate 44 may be any type of wall, sheet metal, panel, baffle, rigid plastic, or generally non-porous solid structure that is oriented to the adjacent respective opening in the tubesheet 28 for the respective filter element 32.

In certain implementations, the accumulator arrangement includes a second plate 46 oriented at an opposite end of the opening 30 at the tubesheet 28 from the first plate 44. In the embodiment shown, the first and second plates 44, 46 are aligned with the general direction of the pulse, but the angle does not necessarily need to be the same as the angle of the pulse direction. FIG. 2 illustrates a center line of the direction of the pulse at 48. The first plate is mounted at a first angle 50 relative to the tubesheet 28. The first angle is within about 5° of center line 48 of a direction of the pulse. Similarly, the second plate 46 is mounted at a second angle 52 relative to the tubesheet 28. The second angle 52 is within about 5° of the center line 48 of a direction of the pulse. In some embodiments, the first angle 50 and the second angle 52 are equal. In other embodiments, the first angle 50, and second angle 52 are unequal. In some embodiments, the first angle 50 and the second angle 52 are within 30° of being parallel to each other. The angles 50, 52 of the plates 44, 46 are selected based upon the angle 53 of the pulse.

As illustrated in FIG. 2, the first plate 44 has length $L_1$, which is preferably no longer than three times the length of the respective opening 30 in the tubesheet 28. This is because primary flow pressure loss increases with increase in length. Preferably, the length $L_1$ has a length that is between 25-75% of a length of the respective opening 30 in the tubesheet 28. In preferred embodiments, the blowpipe 40 is spaced no more than 30-40 times of an inside diameter of the blowpipe from the tubesheet to eject the pulse.

In FIG. 2, reference numeral 72 shows the offset between the pulse center line 48 and a center of the filter element 32. This shows how the center line 48 of the pulse is not always in alignment with the center of the filter element 32.

In one embodiment, the plate that is closer to the respective blow pipe 40 (in the embodiment illustrated, the second plate 46) has a length that is shorter than the other plate (in this example, the first plate 44). In one embodiment, this shorter plate 46 has a length that is not less than 5% of a length of the respective opening 30 in the tubesheet 28. This arrangement is advantageous because of both material savings and pressure loss associated with pumping air flow.

Figure 3:
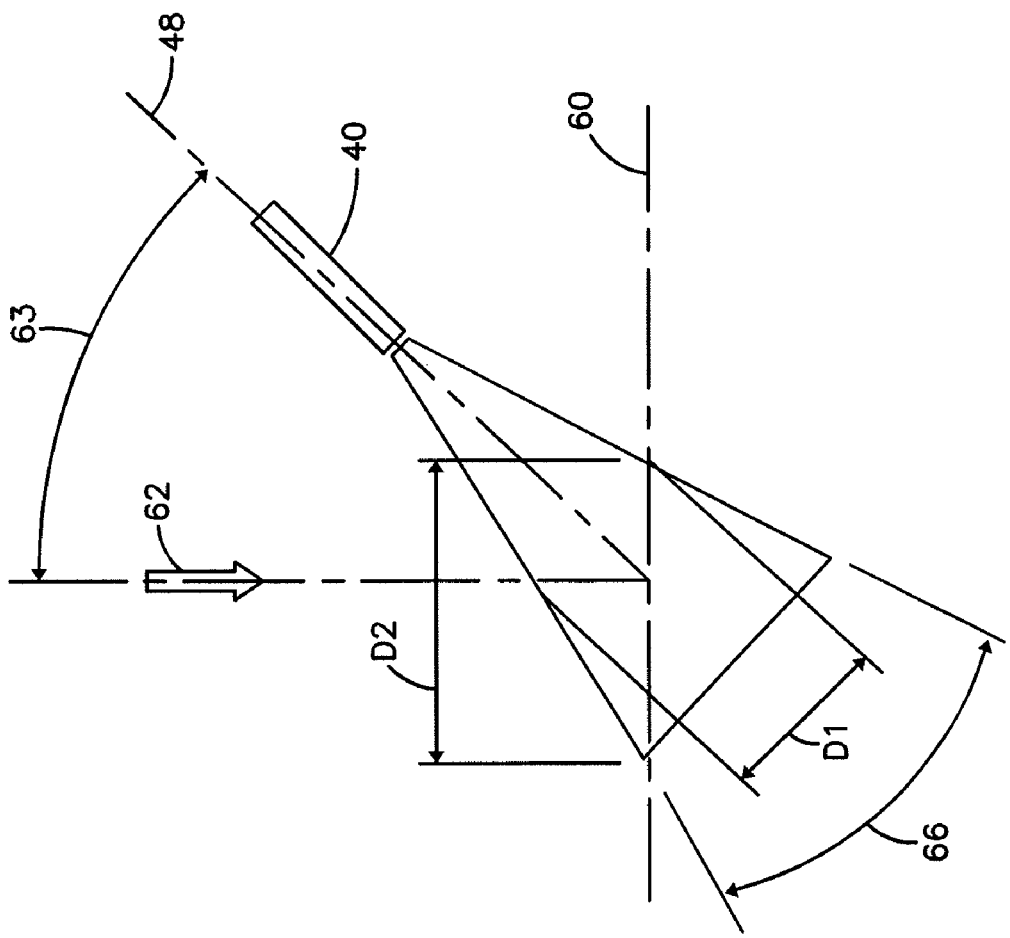
FIG. 3 is a schematic diagram illustrating principles of this disclosure.
Figure 4:
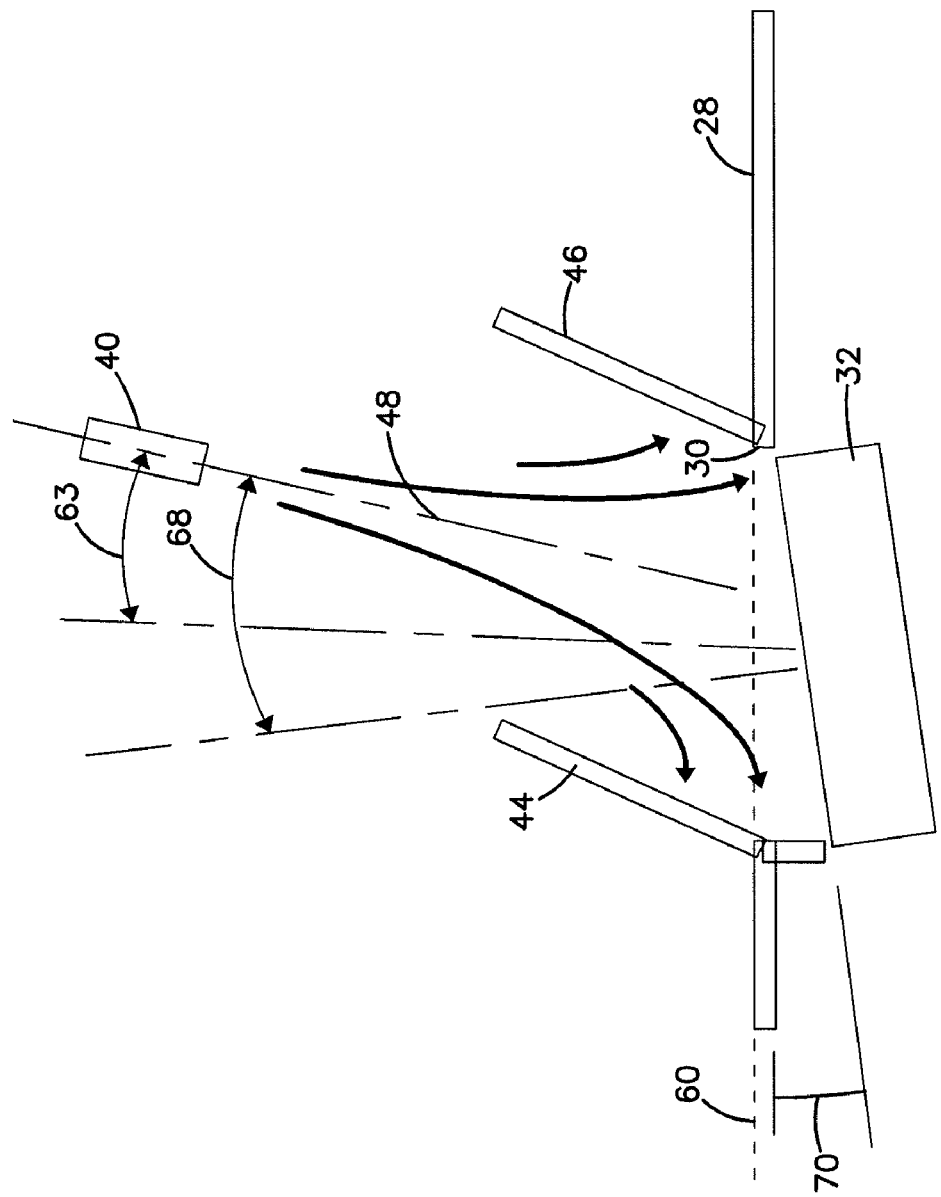
FIG. 4 is a schematic diagram illustrating principles of this disclosure.

Attention is directed to FIG. 3. In FIG. 3, the arrow 62 represents the prior art pulse direction. In the prior art, the standard pulse direction is directed perpendicular or normal to the plane 60 that contains the tubesheet 28. By the word "perpendicular" or "normal", it is meant 90°± of 5°. Angle 63 shows the angle that is offset to the vertical direction, or the direction from the standard, prior art direction shown by arrow 62. A typical pulse expansion is shown at angle 66, from the blow pipe 40. As explained above, the exhaust jet from the blow pipe 40 creates a diameter D2, covering a larger surface area in the opening 30 of tubesheet 28, versus diameter D1 that comes from the exhaust jet shown at arrow 62 in the prior art arrangement. In FIG. 4, an alternative arrangement of the filter element 32 relative to the tubesheet 28 is shown. In the FIG. 4 embodiment, the filter element 32 is offset at an angle 70 relative to the tubesheet opening 30. This arrangement results in an angle 68 of the pulse direction 48 greater at the face of the filter 36 than the angle 68 of the pulse direction 48 at the plane 60 of the tube sheet opening 30.

One useful arrangement has the following angles and dimensions: Angle 64 is 25°-35°, preferably 29°; angles 50 and 52 are equal and 18°-25°, preferably 22°-23°; first and second plates 44, 46 are parallel; offset 72 is about 1 inch; length L1 is about 16-20 inches, preferably about 18.75 inches; and length L2 is about 6-10 inches, preferably about 8.0 inches.

Figure 5:
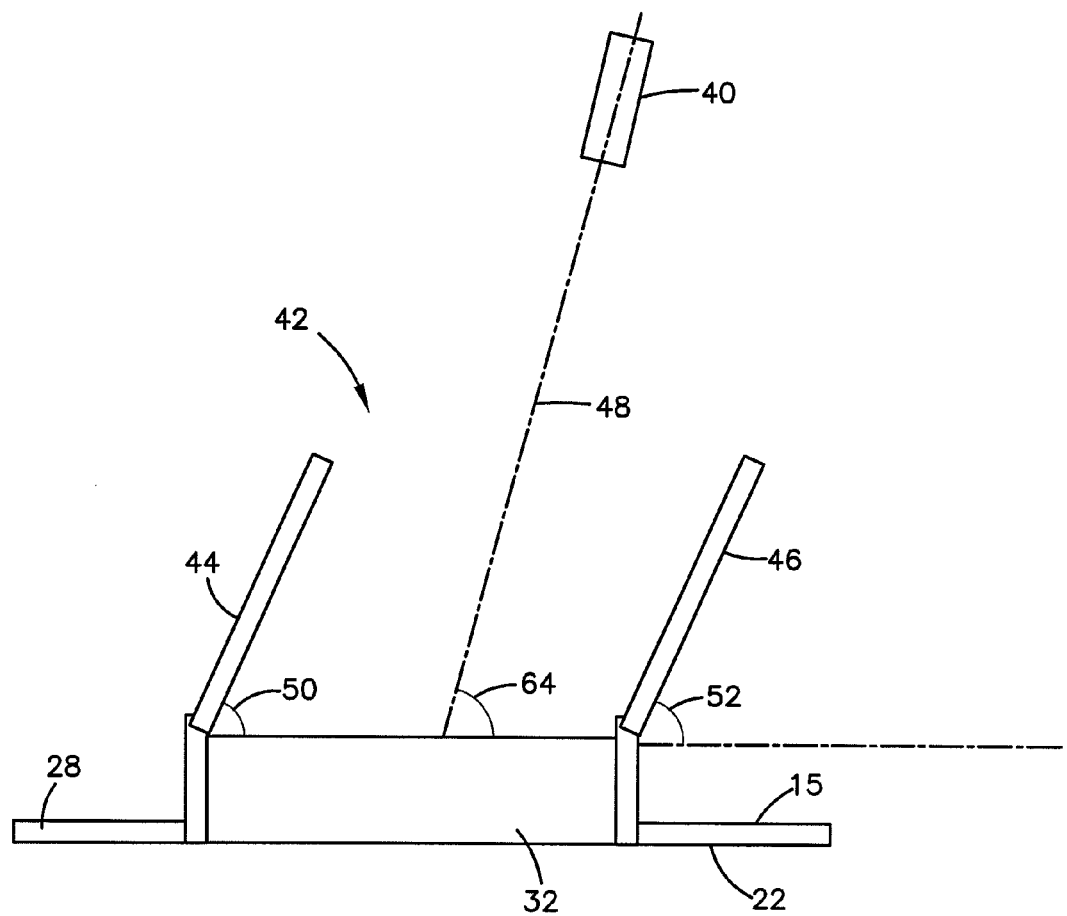
FIG. 5 is a schematic diagram illustrating principles of this disclosure.

FIG. 5 illustrates another implementation. In the diagram in FIG. 5, it is shown in how the filter element 32 is oriented completely within the clean air chamber 15. This is helpful because it helps to reduce or eliminate media abrasion or damage that can be caused by direct impact of dust in the flow in the dirty air plenum. This arrangement also eliminates surfaces in the dirty air plenum that can allow for dust and material buildup and make eventual cleaning difficult. Additional advantages are gained by lowering the air flow velocities in the dirty air plenum by elimination of flow path obstructions.

Figure 6:
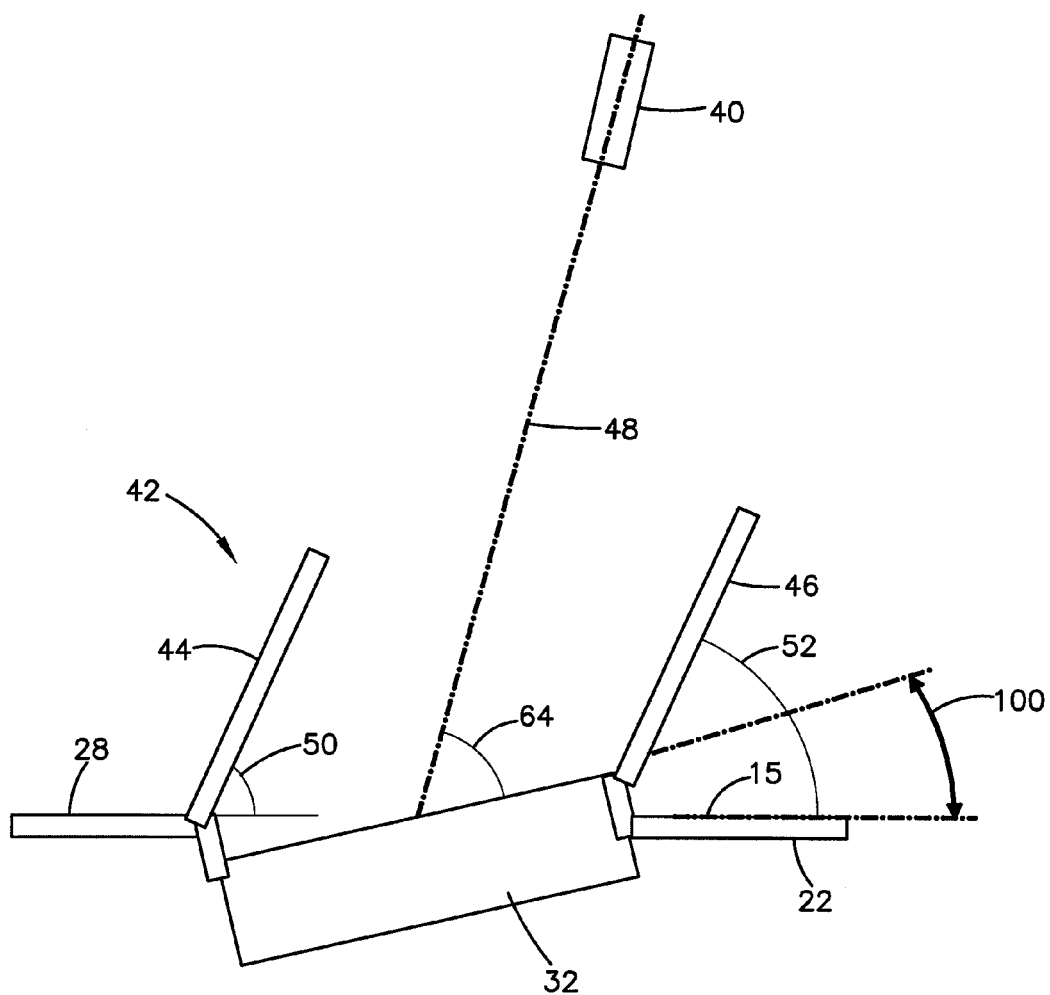
FIG. 6 is a schematic diagram illustrating principles of this disclosure.

FIG. 6 shows another illustration of an arrangement. In FIG. 6, the filter element 32 only partially protrudes into the dirty air chamber 22, with the rest of the filter element 32 being in the clean air chamber 15. The angle 100 of the filter 32 relative to the tubesheet 28 can be from 0° to 90°, depending upon the application and/or the pulse design requirements. The arrangement in FIG. 6 has advantages in that it helps substantially reduce or eliminate media abrasion or damage that can be caused by direct impact of dust in the flow in the dirty air plenum. Additional advantages are gained by lowering air flow velocities in the dirty air plenum through elimination of flow path obstructions.

Figure 7:
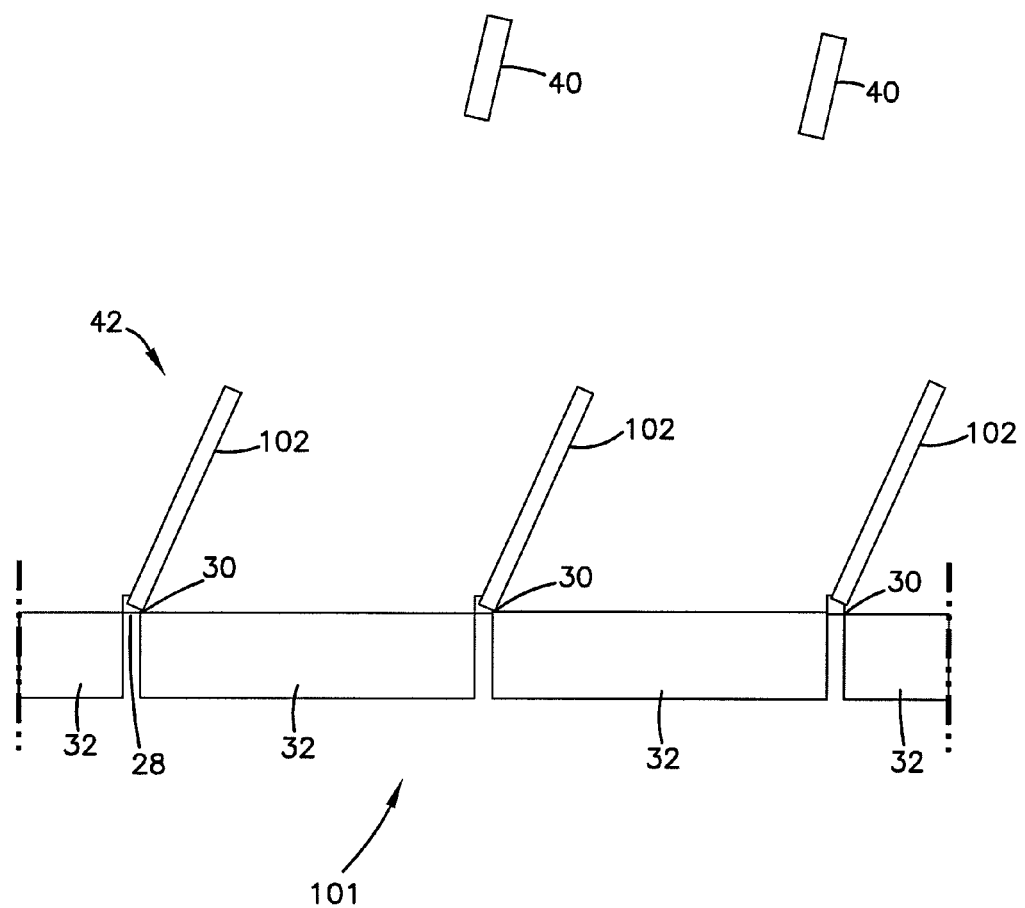
FIG. 7 is a schematic diagram illustrating principles of this disclosure.

FIG. 7 illustrates another arrangement, in which a panel-style filter arrangement is oriented such that each one of the plurality of openings 30 in tubesheet 28 is covered by the panel-style filter arrangement 101. In the particular embodiment shown, the panel-style filter arrangement 101 comprises a plurality of individual panel-style filter elements 32, with one filter element 32 occupying a corresponding opening 30 in the tubesheet 28. The accumulator arrangement 42 includes a plurality of plates 102, analogous to plates 44, 46, described above. The accumulator arrangement 42 includes, for each opening 30 in the tubesheet 28, a first and second plate 102 is adjacent to opposite ends of the tubesheet opening 30, with adjacent openings 30 in the tubesheet 28 sharing one of the plates 102.

Figure 8:
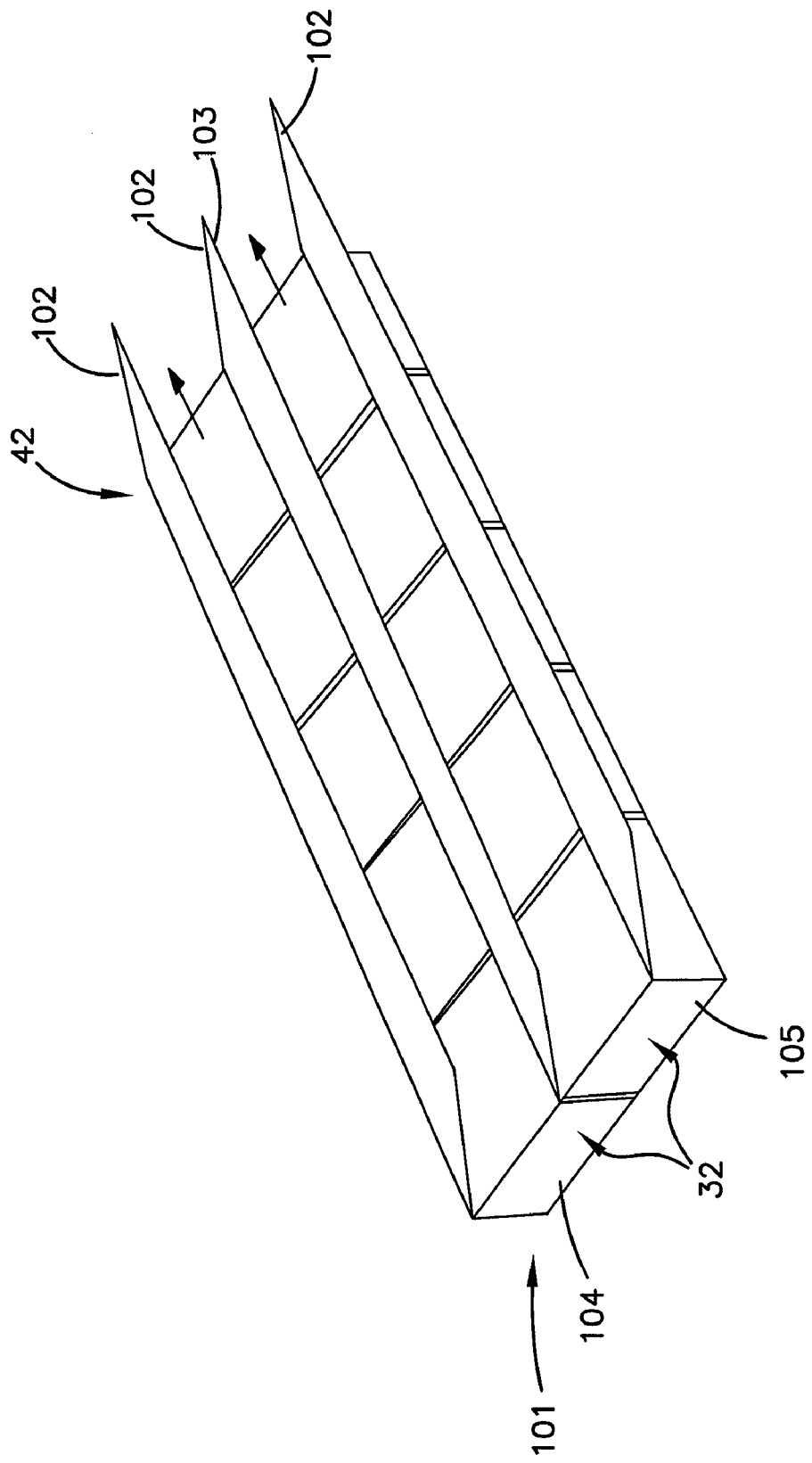
FIG. 8 is a schematic, perspective view illustrating principles of this disclosure.

FIG. 8 is a schematic diagram illustrating how a series of panel-style filter elements 32 can be arranged in rows and columns, with the elements 32 sharing plates 102 for the accumulator arrangement 42. In the embodiment of FIG. 8, plate 103 is a common, shared plate between a first row 104 of elements 102 and a second row 105 of elements 102.

Figure 9:
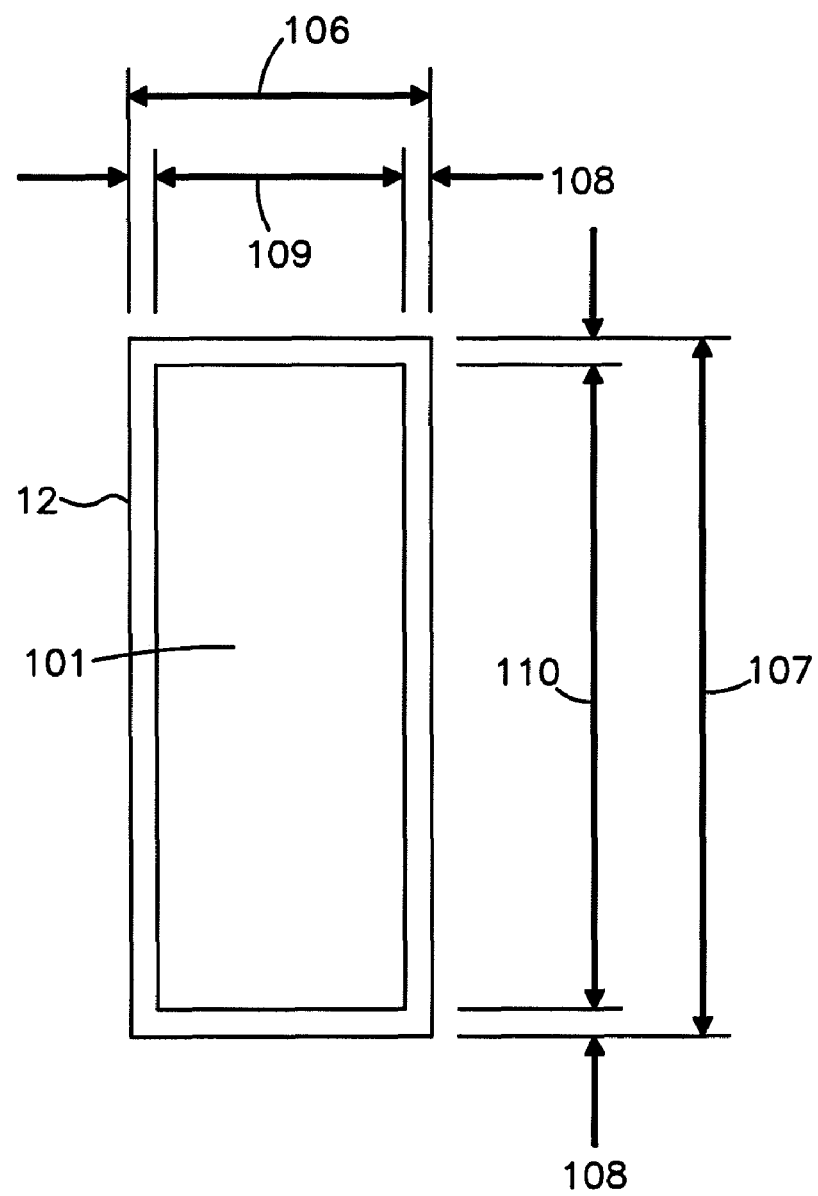
FIG. 9 is a schematic diagram illustrating principles of this disclosure.

FIG. 9 is another schematic diagram illustrating principles of this disclosure. In FIG. 9, the panel-style filter arrangement 101 is depicted mounted within the air cleaner housing 12. The panel-style filter arrangement 101 can be one, long filter element, or it can be a series of individual filter elements 32. In FIG. 9, the housing width is shown at dimension line 106. The housing length is shown at dimension line 107. Dimension 108 illustrates the space between the housing 12 and the filter arrangement to accommodate clamps for mounting the filter arrangement 101. Therefore, this diagram illustrates that the area occupied by the media dimension 109 multiplied by dimension 110 is large in relation to the total area of the tube sheet (dimension 106 multiplied by dimension 107).

Figure 10:
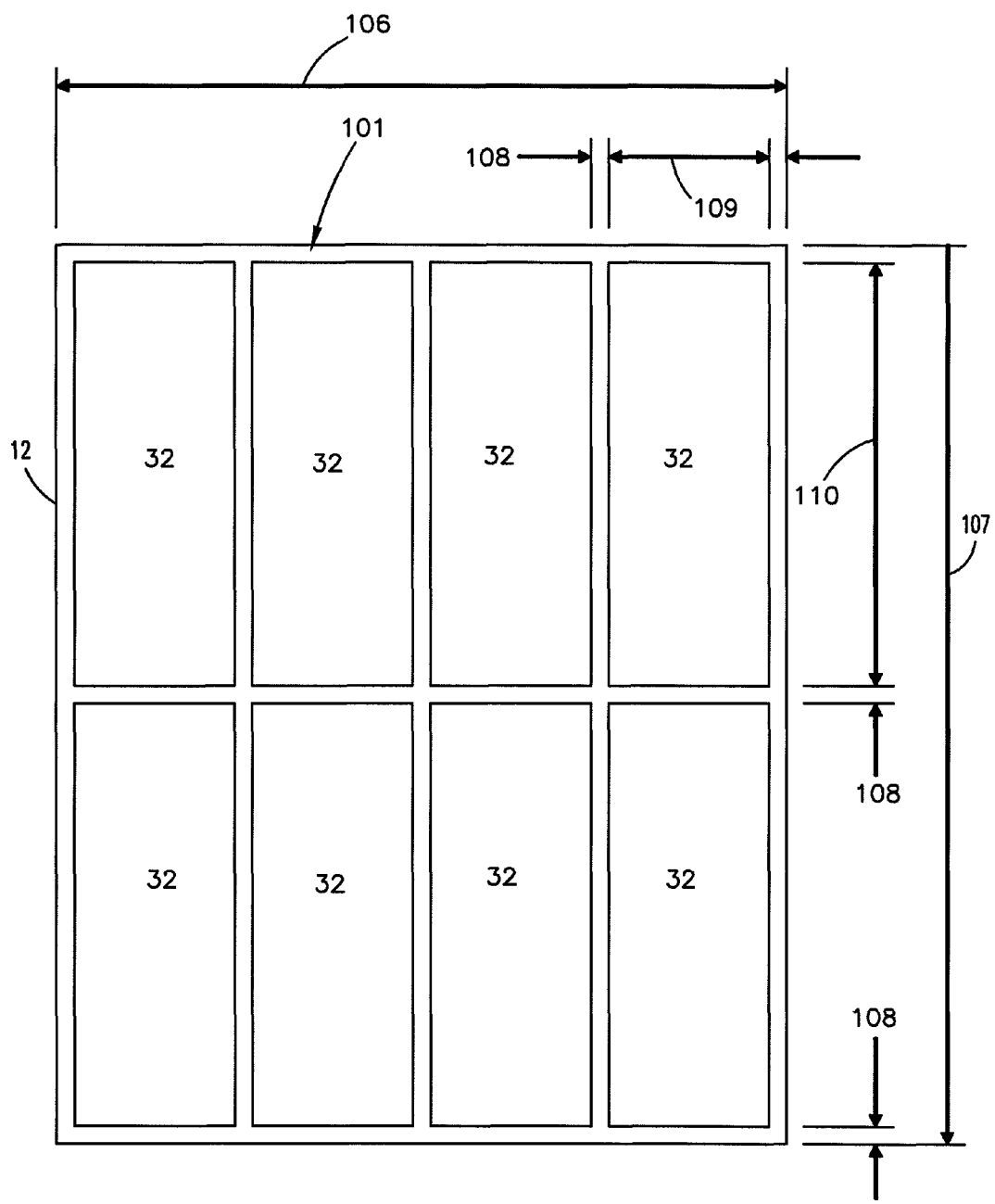
FIG. 10 is a schematic diagram illustrating principles of this disclosure.

FIG. 10 is another schematic diagram of the arrangement. In FIG. 10, the filter arrangement 101 includes multiple, longer filter elements 32 that are combined to fill the filter housing 12. The arrangement of FIG. 10 has a larger percentage of open area per tubesheet area as compared to prior art arrangements. Dimension 109 is the width of the filter elements 32. Dimension line 110 shows the length of the filter elements 32. This arrangement illustrates, analogous to FIG. 9, that the area occupied by the media is large in relation to the total area of the tubesheet.

Figure 11:
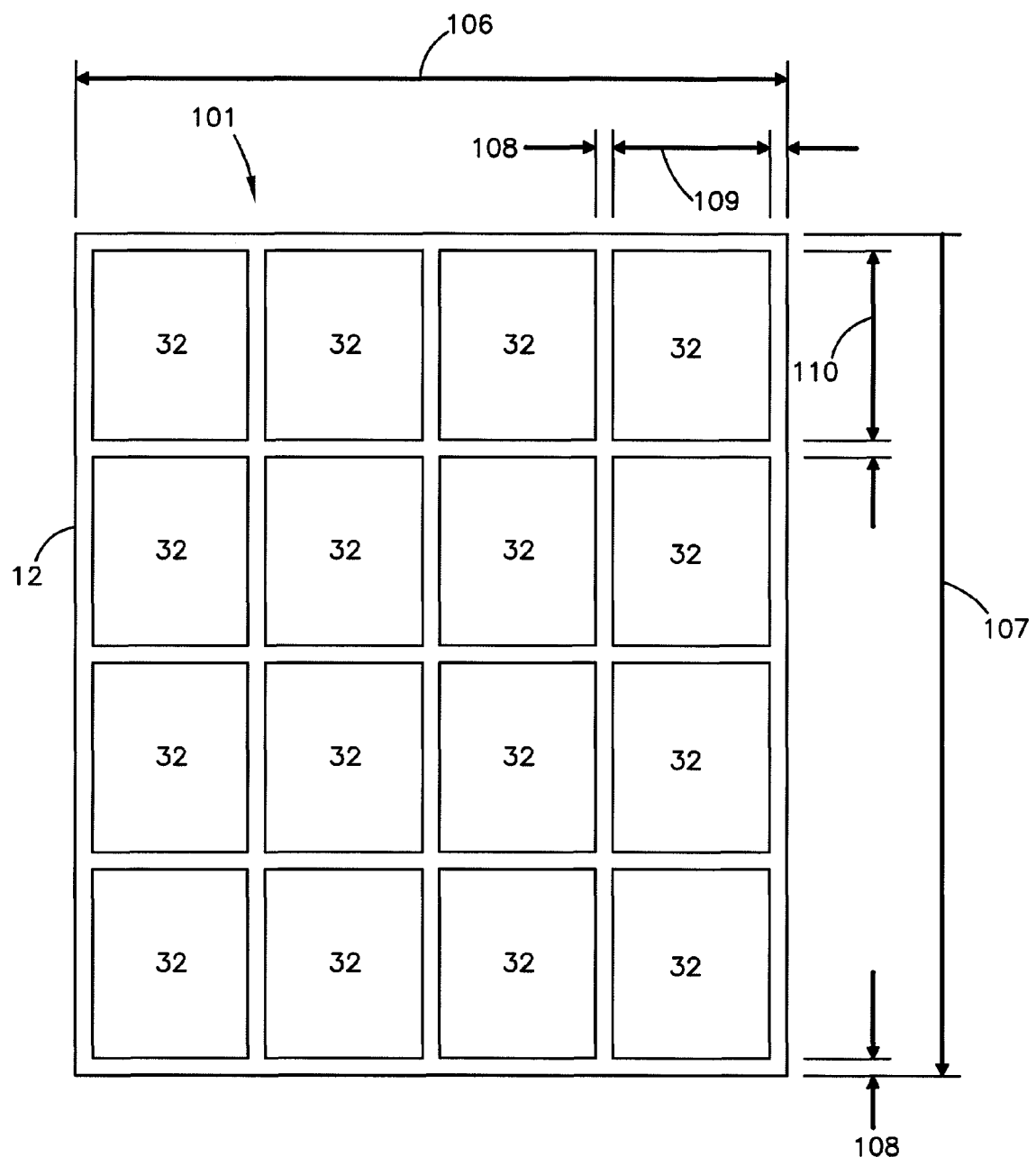
FIG. 11 is a schematic diagram illustrating principles of this disclosure.
Figure 12:
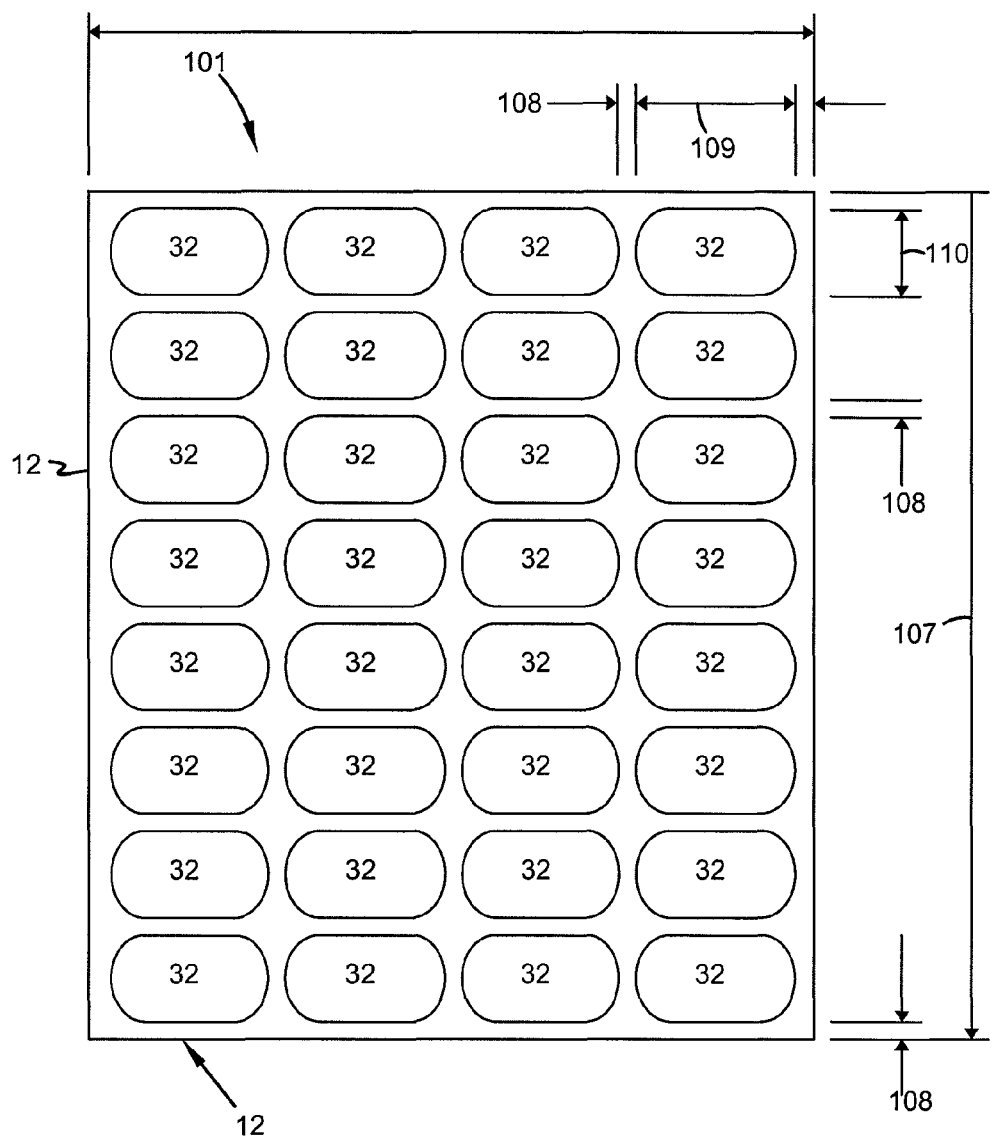
FIG. 12 is a schematic diagram illustrating principles of this disclosure.

FIGS. 11 and 12 are similar to FIG. 10, except that it shows multiple, shorter filter elements 32 combined to fill the filter housing 12. These embodiments, as compared to the FIG. 10 embodiment, has less of a percentage of open area per tubesheet area than the concept shown in FIG. 10, which has larger, longer filter elements 32.

Figure 13:
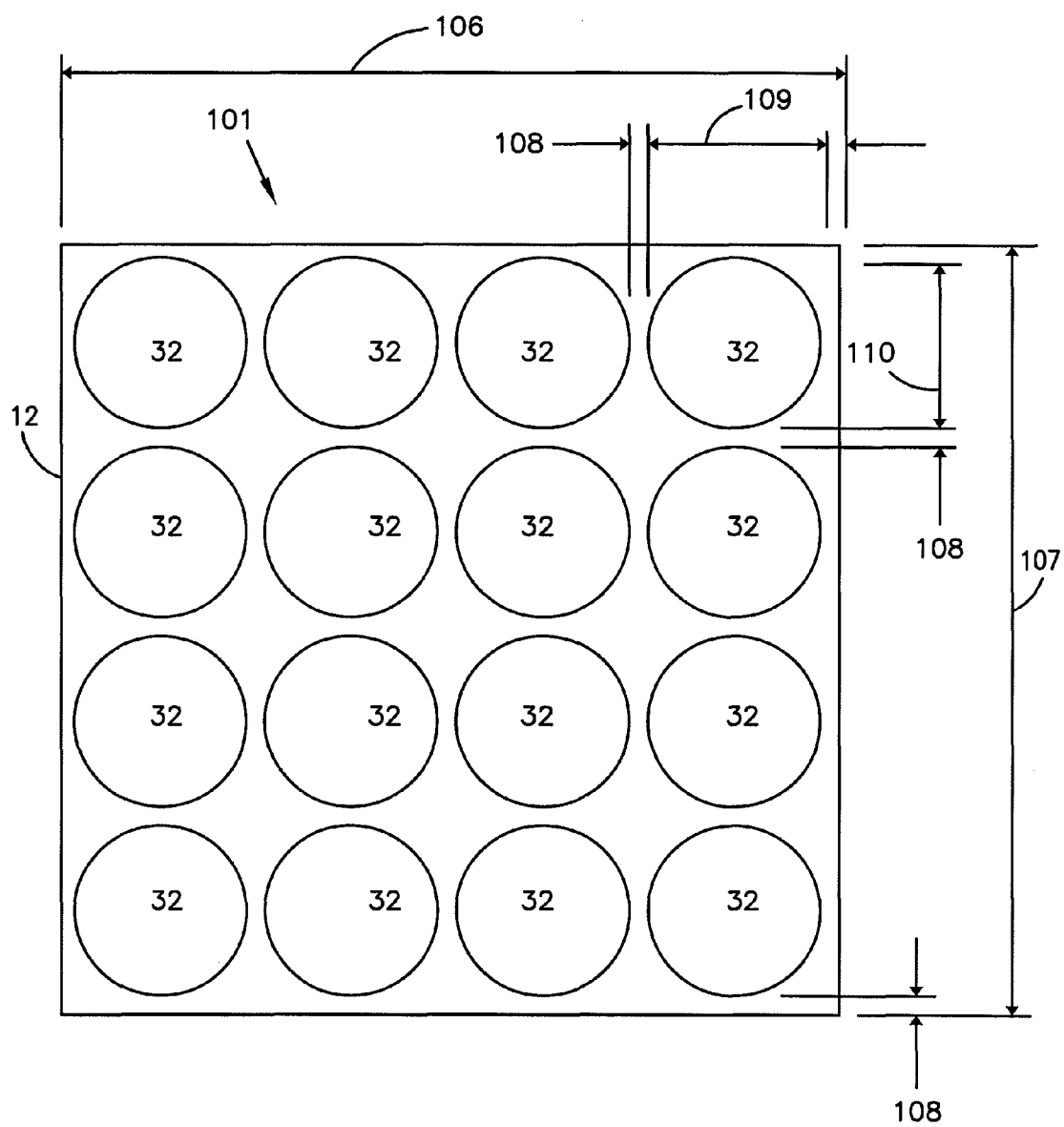
FIG. 13 is a schematic diagram illustrating principles of this disclosure.
Figure 14:
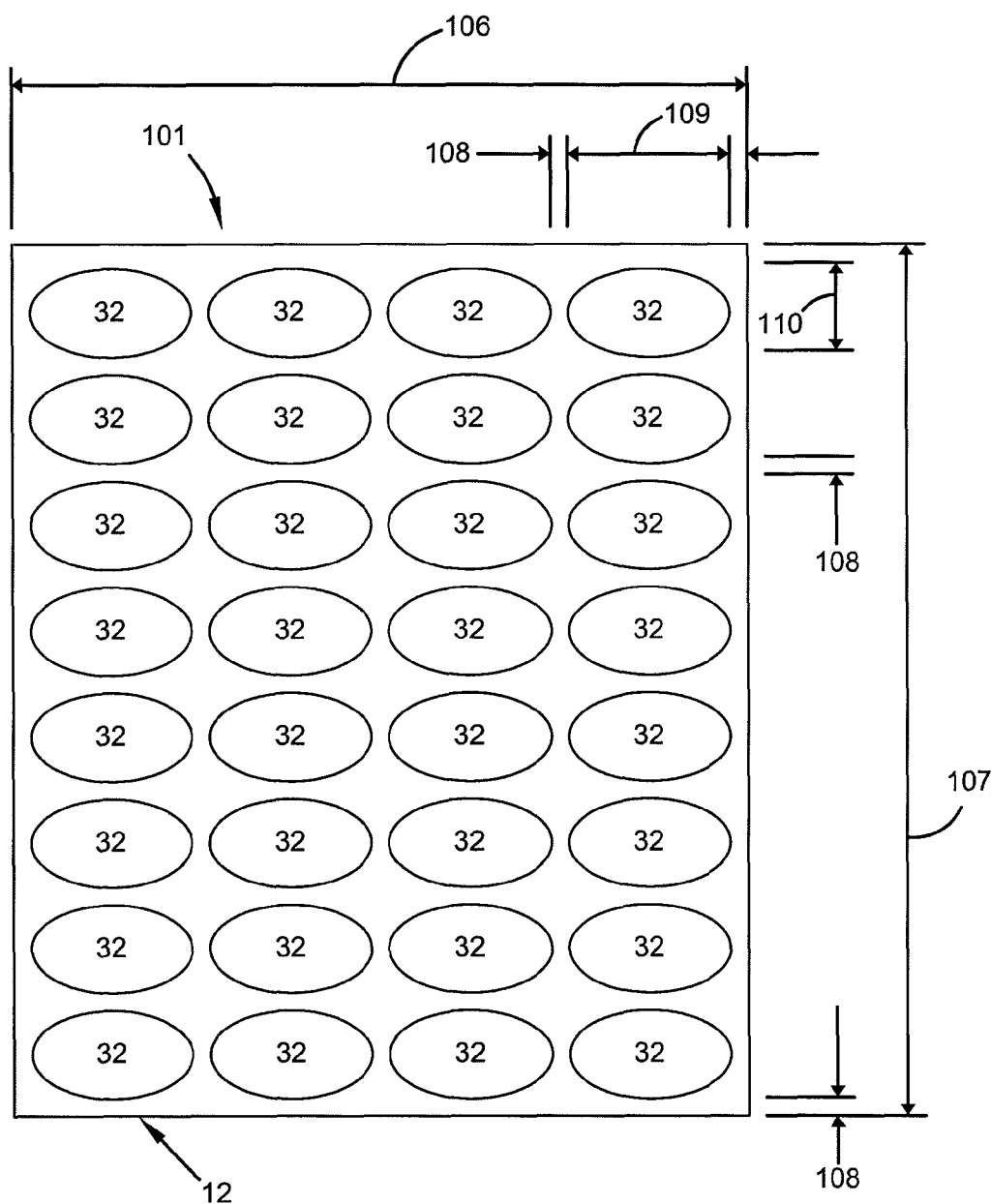
FIG. 14 is a schematic diagram illustrating principles of this disclosure.

FIGS. 13 and 14 are further embodiments. In FIGS. 13 and 14, the panel-style filter arrangement 101 is illustrated as being a plurality of round (FIG. 13) or oval (FIG. 14) filter elements 32. This arrangement is less effective in utilization of the available tubesheet space for primary air flow, as can be seen by comparing the geometry of FIGS. 13 and 14 to the geometry of FIGS. 10-12. However, the arrangement of FIGS. 13 an 14 still illustrate the advantages and usefulness of the principles of this disclosure in that smaller filters may be desired for both handling and disposal.

The invention claimed is:

1. An air cleaner comprising:
   (a) a housing including a dirty air inlet, a clean air outlet, and an interior;
   (b) a planer tubesheet in the housing interior having a plurality of openings in the same plane as the tubesheet;
   (c) a filter arrangement comprising a plurality of individual z-media panel-style filters, each filter having a flow face and being oriented to cover one of the openings in the tubesheet such that the filter flow face is generally parallel to the plane of the tubesheet; each of the filters being mounted in the respective one of the openings to permit air to flow through the filter faces in a straight flow through direction;
   (d) a plurality of blowpipes; each blowpipe being oriented to direct a fluid pulse at a respective one of the openings in the tubesheet covered by the panel-style filter arrangement;
      (i) each blowpipe having an inside diameter and being spaced no more than 30-40 times of the inside diameter of the blowpipe from the tubesheet;
      (ii) each blowpipe being oriented to direct a fluid pulse at a respective one of the openings in the tubesheet covered by the panel-style filter arrangement at an angle that is:
         (A) not normal to the plane of the openings in the tubesheet;
         (B) not in line with the direction of filtration flow through the respective panel-style filter; and
         (C) offset to a plane of the openings in the tubesheet of about at least 25°; and
   (e) an accumulator arrangement oriented adjacent to the openings in the tubesheet on a downstream side of the tubesheet; the accumulator arrangement including:
      (i) for each opening in the tubesheet, a first and second plate adjacent to opposite ends of the tubesheet opening and extending from and being angled relative to the plane of the tubesheet and the opening;
         (A) adjacent openings in the tubesheet sharing a same first or second plate.

2. An air cleaner according to claim 1 wherein:
   (a) the first plate is mounted at a first angle relative to the tubesheet, the first angle being within about 85° of a center line of a direction of the pulse; and
   (b) the second plate is mounted at a second angle relative to the tubesheet, the second angle being within about 85° of a center line of a direction of the pulse.

3. An air cleaner according to claim 2 wherein:
   (a) the first angle and second angle are equal.

4. An air cleaner according to claim 2 wherein:
   (a) the first angle and second angle are unequal.

5. An air cleaner according to claim 2 wherein:
   (a) the first angle and second angle are within 85° of being parallel to each other.

* * * * *